Aug. 9, 1949. E. G. BLACHERE 2,478,651
VINTAGE DESTEMMING AND PRESSING MACHINE
Filed Nov. 9, 1948
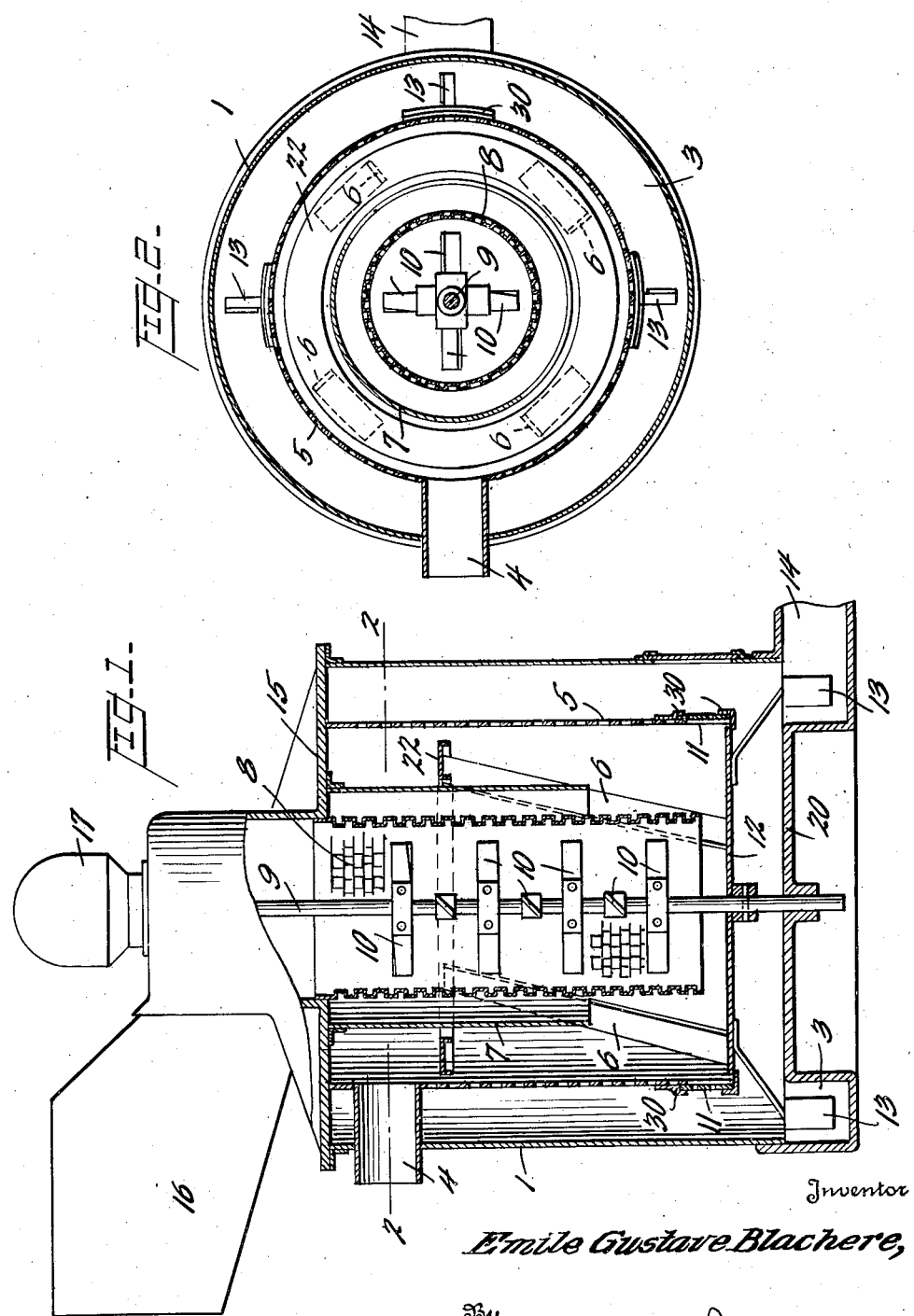
Inventor
*Emile Gustave Blachere,*
By *J. Richard Paris.*
ATTORNEY Patented Aug. 9, 1949

2,478,651

UNITED STATES PATENT OFFICE 2,478,651

VINTAGE DESTEMMING AND PRESSING MACHINE

Emile Gustave Blachere, Hussein-Dey, Algiers, Algeria

Application November 9, 1948, Serial No. 59,170
In France April 16, 1947

2 Claims. (Cl. 146—76)

The present invention relates generally to a machine which is designed to receive the grape vintage and to deliver the must derived from the vintage to the fermentation vats.

Some wineries employ a must which is free of all stems and stalks, while other wineries include the stems and stalks in the must. When a clear or white wine is being made, it is generally desirable to eliminate the stems and stalks from the must. On the other hand, where a red wine is being made it is often desirable to include the stems and stalks in the must. In these wines the fermentation process, in addition to color, also derives other ingredients from the stems and stalks which give the wine a desirable body and flavor.

The present invention provides a machine which may be employed in either of these processes as desired. Thus the machine may be employed for de-stemming the vintage, separating the stems and stalks, and subjecting the grapes to a pressing or crushing operation and feeding the pressed grapes, including the juice, and skins free of stalks and stems to the fermentation vat. The same machine may also be employed for crushing and pressing the vintage, including the grapes, stems and stalks and delivering this crushed or pressed mixture to the fermentation vat.

The present invention provides an apparatus which receives the vintage which includes the grapes in bunches, or clusters, as harvested from the vines and which obviously also includes the stalks and the stems of the grapes. The vintage is there subjected to two successive crushing or pressing treatments. The first crushing is primarily a de-stemming operation. In this first treatment the stalks and stems are detached from the grapes. This de-stemming operation involves a treatment which also causes a crushing of the grapes with the consequent production of grape juice.

Before the must leaves the machine the vintage is subjected to a further crushing and pressing operation which completes the pressing desirable for the production of a suitable must which is delivered to the fermentation vats.

Intermediate the two crushing operations the stems and stalks may be separated from the crushed vintage and expelled from the machine. If desired this separation and expulsion of the stems and stalks may be obviated and the vintage then flows from the first treatment to the last treatment and the must delivered to the fermentation vats then contains the stalks and stems as well as the juice and crushed grapes.

In the drawings, which are illustrative of the present invention, variations thereof falling within the scope of the appended claims being apparent to persons skilled in the art, Fig. 1 is a vertical sectional view of the apparatus and Fig. 2 is a horizontal sectional view taken in line 2—2 of Fig. 1.

The apparatus constituting the present invention is a single integral unit rugged and simple in construction. The vintage, in the form of grape clusters as harvested, is subjected to blows and impacts by a series of paddles which also project the clusters by centrifugal force against the walls of the receiving passage. The grapes are also at the same time subjected to pressure between the paddles and the wall of the passage. During this treatment the stems and stalks are detached from the grapes, and the grapes are also subjected to considerable crushing and pressing with the resultant formation of juice.

After leaving the receiving and de-stemming pasage the vintage is subjected to air flotation or suction so that the stalks and stems are drawn upwardly from the crushed grapes and discharged from the apparatus while the juices flow to the vat and the crushed grapes pass to the second and final crushing or pressing operation.

The outer cylinder 4 of the present apparatus is provided with a cover 15 having a lateral feed hopper 16 for feeding the vintage into the upper end of the central cylinder 8. The motor 17 mounted on top of the cover 15 rotates the shaft 9 which is supported at its ends in the cover 15 and in the bottom 20 of the cylinder 4. The bottom 20 is provided with an annular channel 3 having an outlet 14.

The cylinder 8 constitutes a receiving and de-stemming passage and extends downwardly into the cylinder 4 and its open lower end is spaced from the bottom 20 as shown. This cylinder 8 may under some conditions be perforated but it is preferred that it should be imperforate but made of rough plate which is provided with a multiplicity of knoblike protuberances. This form prevents the possibility of clogging the cylinders 8; something which may happen when the cylinder is perforated by reason of the fact that pieces of stem or stalk catch in the perforations and may remain lodged therein.

The arbor or shaft 9 passes lengthwise and concentrically of the cylinder and carries a series of paddles 10. These paddles act upon the incoming vintage primarily to detach the grapes from the stems and stalks, and serve also to subject the grapes to a pressing and crushing operation. This is accomplished by the violent and repeated impact of the successive paddles against the grapes, the latter being thereby thrown against the rough surfaces of the cylinder 8. The mass is at the same time being rotated within the cylinder and subjected to pressure between the paddles and the cylinder. As a result of the action of the paddles 10 the grapes are detached from the stems and stalks, and the grapes are crushed and pressed. This mixture of crushed grapes and broken stems and stalks is delivered by the cylinder 8 and its paddles 10 to the rotating disc 12.

The disc 12 is carried by the shaft 9 and rotates therewith. A plurality of paddles 13 are carried by the rotating disc 12. The paddles 13 are disposed in the channel 3 and as will be seen later, act upon the crushed grapes to subject the same to further pressing and crushing.

The cylinder 5 is of perforated metal or of open lattice work. The perforations or openings in the lattice work permit the juice to pass through and are of a size permitting the crushed grapes to pass but holding back the broken stems and stalks. At its lower end the cylinder 5 has openings which are provided with doors 11 of the same perforated sheet metal or open lattice work metal as the cylinder 5. The doors 11 may be hinged so that they may be moved to open position or if desired they may be slid in guides 30 to the open position.

The disc 12 carries the inclined vanes 6 which are held together to form a relatively rigid construction by the annular plate 22. The vanes 6 are rotated together with the disc 12, serve to rake and stir up the mixture of crushed grapes and broken stalks and stems and to create an air draft which draws the stalks and stems upwardly and are expelled from the apparatus through the outlet 4.

The cylinder 7 of solid metal plate, is disposed between the cylinders 5 and 8 and serves to constrict the space at the upper end of the vanes 6 and thus cause an increase in the speed of the air in the upper part of the chamber.

The flotation and expulsion of the stalks and stems takes place only when the doors 11 are closed as shown in the drawings. Under this condition the mixture of crushed grapes and stems and stalks is delivered by the cylinder 8 to the rotating disc 12. The mixture is thrown by centrifugal force against the cylinder 5 and the juice and crushed grapes pass through the cylinder and into the channel 3. The vanes 6 at the same time create a suction which continuously dries the stalks and stems and draws the same upwardly and outwardly through the outlet 4. The crushed grapes in the channel 3 are further crushed and pressed by the paddles 13 which operate in the channel 3 to press and crush the grapes and to rake the same. The must containing the juice and grapes pass out through the passage 14, whence it is delivered to a fermentation vat by the aid of a suitable pump.

When it is desired to prepare a must which contains the stems and stalks the doors 11 are moved to open position. Under these circumstances the rotating disc 12 acts to throw the mass outward and through the openings in cylinder 5 by centrifugal force. The rotating vanes 6 aid in the expulsion of the mass from the cylinder 5 and into the channel 3 by their stirring action which eliminates the possibility of any packing of any part of the mass.

Thus when the doors 11 are open the vintage is subjected to the two successive pressing and crushing treatments. In the first treatment the grapes and stems are detached and both are subjected to a crushing and pressing by the action of the blades 10 in and against the cylinder 8. The stems and stalks will not be removed from the mass and instead the grapes and the stems and stalks all together will be fed with channel 3 where the mass is again subjected to further pressing and crushing and delivered to the vats through the outlet 14 and aided by a suitable pump.

I claim:
1. An apparatus for the preparation of a grape must from a vintage, comprising an outer casing having in its upper portion an inlet for the vintage, an outlet for the must in its lower portion, and a second outlet in an intermediate portion; a foraminous cylinder disposed vertically within the casing having a passage in communication with the second outlet and having at least one opening adjacent its lower end; a foraminous closure for said opening having open and closed positions; means disposed within the cylinder for separating the woody material of the vintage from the grapes and for crushing the grapes; a rotatable bottom for the cylinder; and impeller means carried by the bottom and rotatable therewith to pass the crushed grapes through the cylinder, the woody material being held back by the cylinder when the closure is in the closed position and being expelled through the second outlet by the impellers, thereby producing a must substantially free of woody material; the apparatus also serving, with the closure in open position, to produce a must containing woody material by the expulsion through said opening of woody material with the crushed grapes.

2. An apparatus for the preparation of a grape must from a vintage comprising a casing having a must outlet and a second outlet; a foraminous cylinder disposed within the casing having a passage in communication with the second outlet and having at least one opening adjacent its lower end; a foraminous closure for the opening having open and closed positions; means for separating the woody material of the vintage from the grapes and for crushing the grapes; a rotatable bottom for the cylinder; impeller means carried by the bottom on its upper face and disposed within the cylinder and rotatable therewith to pass the crushed grapes through the cylinder, the woody material being held back by the cylinder with the closure in closed position, and expelled by the impellers through the second outlet thereby producing a must substantially free of woody material; the apparatus also serving, with the closure in open position, to produce a must containing woody material by the expulsion through said opening of woody material with the crushed grapes; and blades carried by the lower face of the bottom for impelling the must to the must outlet.

EMILE GUSTAVE BLACHERE.

REFERENCES CITED

The following references are of record in the file of this patent:

UNITED STATES PATENTS

| Number | Name | Date |
| --- | --- | --- |
| 1,343,439 | Dostal | June 15, 1920 |
| 1,349,739 | Steere | Aug. 17, 1920 |

FOREIGN PATENTS

| Number | Country | Date |
| --- | --- | --- |
| 784,129 | France | Apr. 23, 1935 |
| 668,849 | Germany | Dec. 10, 1938 |